United States Patent
Cok et al.

(10) Patent No.: US 10,733,074 B1
(45) Date of Patent: Aug. 4, 2020

(54) DEDUCTIVE VERIFICATION FOR PROGRAMS USING FUNCTIONAL PROGRAMMING FEATURES

(71) Applicant: Amazon Technologies, Inc., Seattle, WA (US)

(72) Inventors: David R. Cok, Rochester, NY (US); Serdar Tasiran, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 15/957,746

(22) Filed: Apr. 19, 2018

Related U.S. Application Data

(60) Provisional application No. 62/623,998, filed on Jan. 30, 2018.

(51) Int. Cl.
*G06F 11/36* (2006.01)

(52) U.S. Cl.
CPC .................. *G06F 11/3608* (2013.01)

(58) Field of Classification Search
CPC .................................... G06F 11/3608
USPC .................................. 717/124–167
See application file for complete search history.

(56) References Cited

U.S. PATENT DOCUMENTS

| | | | | |
|---|---|---|---|---|
| 5,793,933 A * | 8/1998 | Iwamasa | ............. | G06F 11/2257 706/45 |
| 5,892,947 A * | 4/1999 | DeLong | ............. | G01R 31/2834 703/22 |
| 5,963,739 A * | 10/1999 | Homeier | ............. | G06F 11/3608 714/E11.209 |
| 6,898,784 B1 * | 5/2005 | Kossatchev | ......... | G06F 11/3684 714/E11.208 |
| 7,110,976 B2 * | 9/2006 | Heimermann | ..... | G06Q 10/0631 705/37 |
| 7,281,237 B2 * | 10/2007 | de Jong | ............. | G06F 9/44589 717/126 |
| 7,703,077 B2 * | 4/2010 | Rehof | .................... | G06F 9/546 714/38.14 |
| 7,797,669 B1 * | 9/2010 | Rehof | ................ | G06F 11/3668 717/100 |
| 8,131,532 B2 * | 3/2012 | Cadambi | ............. | G06F 11/3608 703/22 |
| 9,471,327 B2 * | 10/2016 | Arunagiri | ............... | G06F 11/16 |

(Continued)

OTHER PUBLICATIONS

Filliâtre, Jean-Christophe, and Claude Marché. "The Why/Krakatoa/Caduceus platform for deductive program verification." International Conference on Computer Aided Verification. Springer, Berlin, Heidelberg, 2007.pp. 173-177 (Year: 2007).*

Filliâtre, Jean-Christophe, Léon Gondelman, and Andrei Paskevich. "A pragmatic type system for deductive verification." (2016).pp. 1-18 (Year: 2016).*

(Continued)

*Primary Examiner* — Satish Rampuria
(74) *Attorney, Agent, or Firm* — Lowenstein Sandler LLP

(57) ABSTRACT

A processing device receives first specification information for an executable functional programming feature from a program and second specification information for the executable functional programming feature from a specification associated with the program. The processing device aggregates the first specification information with the second specification information to form combined specification information for the executable functional programming feature. The processing device verifies the executable programming feature using the combined specification information.

20 Claims, 8 Drawing Sheets

(56) References Cited

U.S. PATENT DOCUMENTS

| | | | | |
|---|---|---|---|---|
| 2004/0054637 A1* | 3/2004 | Negoro | ............... | G06F 8/10 |
| | | | | 706/45 |
| 2009/0064111 A1* | 3/2009 | Kornerup | ............... | G06F 8/34 |
| | | | | 717/126 |
| 2010/0083233 A1* | 4/2010 | Vanoverberghe | ... | G06F 11/3612 |
| | | | | 717/126 |
| 2010/0235818 A1* | 9/2010 | Sakai | ............... | G06F 8/313 |
| | | | | 717/126 |
| 2012/0246612 A1* | 9/2012 | Ji | ............... | G06F 11/3664 |
| | | | | 717/104 |

OTHER PUBLICATIONS

Le, Xuan-Bach D., et al. "Enhancing automated program repair with deductive verification." 2016 IEEE International Conference on Software Maintenance and Evolution (ICSME). IEEE, 2016.pp. 428-432 (Year: 2016).*

Fragoso Santos, José, et al. "JaVerT: JavaScript verification toolchain." Proceedings of the ACM on Programming Languages 2. POPL (2017): pp. 1-33. (Year: 2017).*

Pettorossi, Alberto, and Maurizio Proietti. "Rules and strategies for transforming functional and logic programs." ACM Computing Surveys (CSUR) 28.2 (1996): pp. 360-414. (Year: 1996).*

Sonnex, Willam, Sophia Drossopoulou, and Susan Eisenbach. Zeno: A tool for the automatic verification of algebraic properties of functional programs. Technical report, Imperial College London, 2011.pp. 1-22 (Year: 2011).*

* cited by examiner

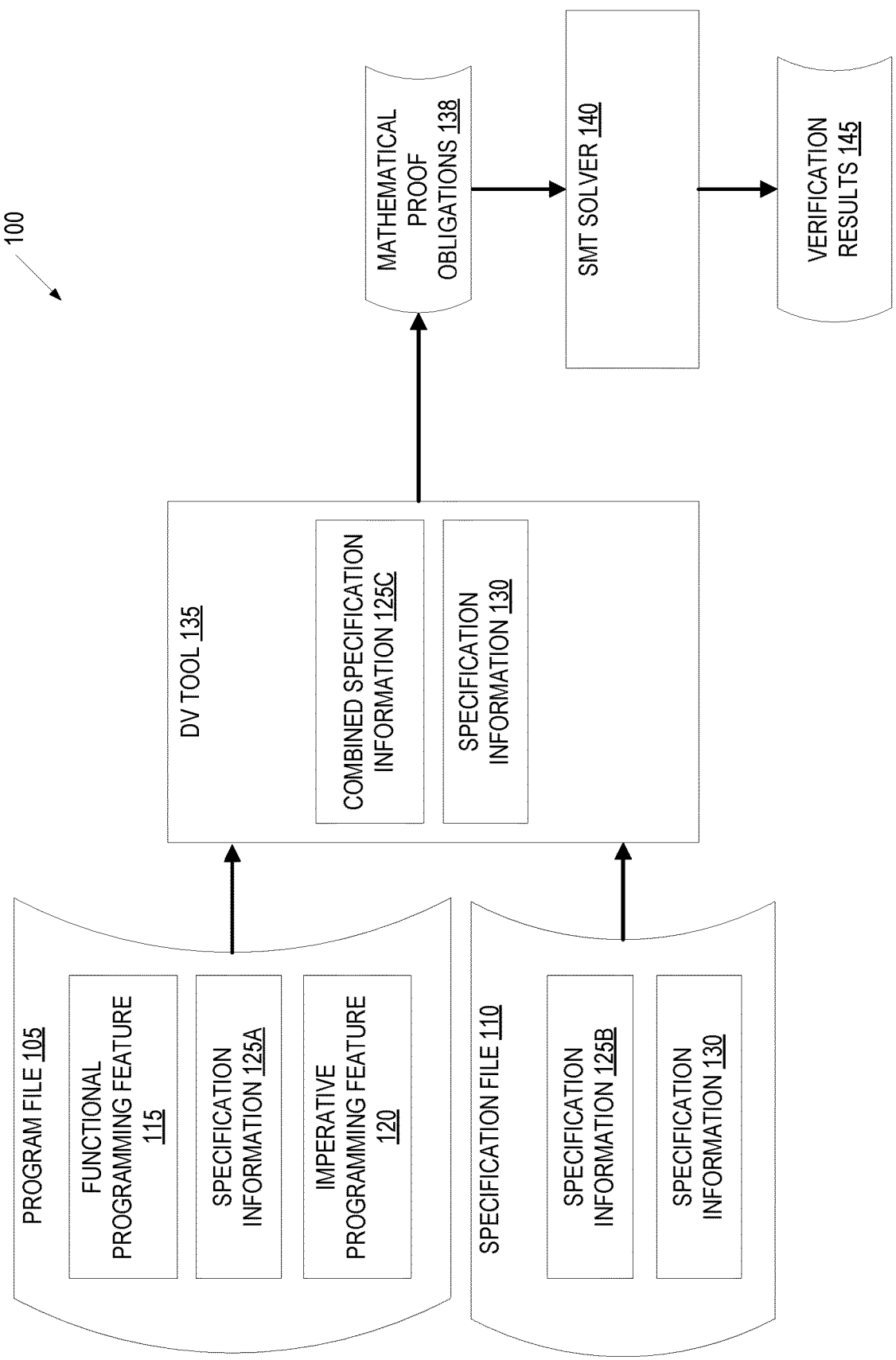

205

```
1 //@ requires i != Integer .MIN_VALUE;
2 //@ assignable \nothing;
3 //@ ensures \result >= 0 && (\result == i || \result == -i);
4 //@ signals (Exception e) false;
5 public int abs( int i );
```

305
```
1 // Example A
2     // Function declaration with a FunctionalInterface parameter
3     private int value;
4     public void modify (Function<Integer ,Integer> map)
5                     { value = map.apply(value); }
6
7     // Using the declaration above
8     modify (x—>x+1);
9
```

310
```
10 // Example B – Stream API
11    Stream<Integer> s = ....
12    s.forEachOrdered (v —> put (v));
13
```

315
```
14 // Example C – General functional composition
15    public static <T,I,R> Function<T,R> compose (
16    Function<I,R> f , Function<T, I> g) {
17    return t —> f.apply (g.apply(t));
18 }
```

FIG. 3

```
1 //@ requires true;
2 //@{ value = map.apply(value); }
3 public void modify(Function<Integer,Integer> map);
```

```
1 //@ requires true;
2 //@         { havoc value; } // changes value to an unspecified int
3 public void modify(Function<Integer,Integer> map);
```

```
1 public interface PositivePureFunction extends
2                         Function<Integer,Integer> {
3      //@ requires i > 0;
4      //@ assignable \nothing;
5      //@ ensures \result > 0;
6      Integer apply(Integer i);
7 }
```

```
1 public void modify (/*@{ PositivePureFunction }@*/
2                    Function<Integer,Integer> map);
```

Specification File 1105

```
1 /*@ { loop_invariant i==\count && 0<=i && i<=this.count ();
2         decreases this.count () – i;
3         for ( int i = 0; i <this.count (); i++)
4           consumer.accept (this.values [ i ]);
5         }@*/
6 Stream<T> forEachOrdered (Consumer<? super T>consumer);
```

Program File 1110

```
1     //@ loop_invariant ... ; loop_modifies ... ; inlined_loop;
2     s.forEachOrdered (v -> put (v));
```

Combined Specification Information 1115

```
1 //@ loop_invariant i==\count && 0<=i && i<=s.count ();
2 //@ loop_invariant ... ;
3 //@ loop_modifies ... , i;
4 //@ decreases this.count () – i;
5 for ( int i = 0; i<s.count (); i++) put (s.values [ i ]);
```

DEDUCTIVE VERIFICATION FOR PROGRAMS USING FUNCTIONAL PROGRAMMING FEATURES

RELATED APPLICATIONS

This patent application claims the benefit under 35 U.S.C. § 119(e) of U.S. Provisional Application No. 62/623,998, filed Jan. 30, 2018, which is incorporated by reference herein.

BACKGROUND

Broadly speaking, programming languages are divided into functional style programming languages and imperative style programming languages. Examples of imperative style programming languages are Java versions 1-7, C, C++, and C #. Examples of functional style programming languages are Lisp, meta language (ML), objective Caml (OCaml), Haskell, and F #. Some recent programming languages such as Java 8 incorporate both imperative programming features and functional programming features.

Often it is difficult to verify whether software will perform the tasks that it was designed to perform. Accordingly, specifications are commonly written that specify what a piece of software is supposed to do. Such specifications may be written in a manner that is machine interpretable by deductive verification (DV) (also called static verification) tools. A DV tool interprets a specification and program code, and then determines whether the program code operates in the manner prescribed by the specification.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 1 illustrates an example deductive verification tool that combines specification information from a program file and a specification file, according to embodiments of the present disclosure.

FIG. 2 illustrates an example specification of an absolute value method, in accordance with one embodiment of the present disclosure.

FIG. 3 illustrates example characteristic uses of functional programming features, in accordance with embodiments of the present disclosure.

FIG. 7 illustrates an example model program for a functional programming feature, in accordance with one embodiment of the present disclosure.

FIG. 8 illustrates an additional example model program for a functional programming feature, in accordance with one embodiment of the present disclosure.

FIG. 9 illustrates example specification information for a functional programming feature, in accordance with one embodiment of the present disclosure.

FIG. 10 illustrates an example program code for a functional programming feature, in accordance with one embodiment of the present disclosure.

FIG. 11 illustrates example combined specification information for a functional programming feature, in accordance with one embodiment of the present disclosure.

DETAILED DESCRIPTION

Figure 4:
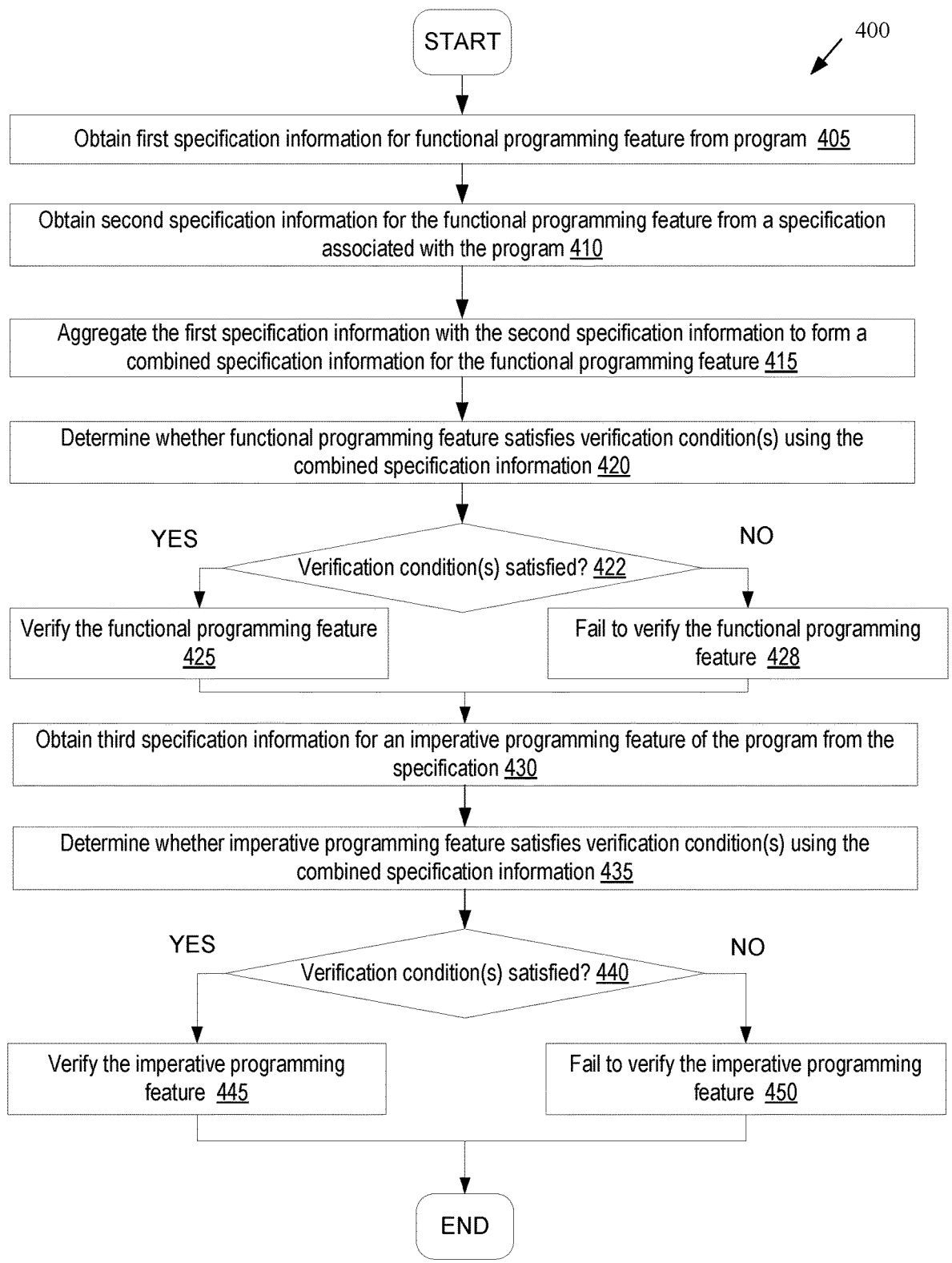
FIG. 4 depicts a flowchart illustrating one embodiment for a method of verifying a functional programming feature using deductive verification.

The present disclosure relates to techniques for representing functional programming features in a manner that is interpretable by automated DV tools, and in particular in a manner that is interpretable by automated DV tools that are configured to verify imperative programming features. Embodiments of the present disclosure provide techniques for specifying functional programming features for a specification language written to handle imperative programming features (e.g., such as the Java Modeling Language (JML)). The present disclosure further relates to a DV tool that is able to verify both functional programming features and imperative programming features of a program. Embodiments of the present disclosure provide methods and systems for converting a functional verification job (e.g., verification of one or more object oriented functional programming features) into an imperative verification job (e.g., verification of one or more equivalent or similar object oriented imperative programming features).

Deductive verification tools have been written for various programming languages. Deductive verification is performed by generating from a program's source code and its associated specification text a collection of mathematical proof obligations (or other verification conditions). If the proof obligations (or other verification conditions) are resolved to be true, this implies that the program source code conforms to the specification text. This results in successful verification of the program source code. The obligations may be verified using interactive theorem provers (such as Higher Order Logic (HOL), ACL2, Isabelle, Coq or, or PVS), automatic theorem provers, or satisfiability modulo theories (SMT) solvers (e.g., such as Z3). A DV tool may generate the mathematical proof obligations and convey this information to the verification system (e.g., an SMT solver), either in the form of a sequence of theorems (e.g., mathematical proof obligations) to be proved or in the form of specifications of system components (e.g. functions or procedures) and perhaps subcomponents (such as loops or data structures).

Computer-aided verification of computer programs often uses SMT solvers. A common technique is to translate pre-conditions, post-conditions, loop conditions, and assertions into SMT formulas in order to determine if all properties can hold. The goal is to ultimately mathematically prove properties about a given program (e.g., that its behavior matches that of its specification).

However, DV tools that are designed to verify imperative style features (imperative programming features) are generally incapable of verifying functional style features (functional programming features). In an example, Java 8 introduced functional programming features, adding a full functional programming style alongside Java's imperative programming style. JML is a specification language for Java programs that uses Hoare style pre-conditions, post-conditions and invariants to specify the behaviors and boundaries of a Java program. JML expresses specifications in a manner that is interpretable by JML DV tools such as OpenJML (an open source DV tool for Java). However, absent applying the techniques set forth herein, JML does not include an ability to represent the new functional programming features of Java 8. Moreover, JML tools are not capable of verifying Java 8 programs that use functional programming features. Similar problems may be encountered with other specification languages and DV tools associated with other programming languages that incorporate both functional programming features and imperative programming features or just functional programming features. Accordingly, embodiments discussed herein enable computing devices to have new capabilities of verifying functional programming features as well as imperative programming features. By verifying functional programming features using the embodiments described herein, processor resources may be conserved by ensuring that previously unverifiable programs operate correctly. This may reduce down time of computing devices, reduce memory leaks, reduce memory utilization, reduce processor utilization, and so on.

Some functional programming features relevant to this disclosure are function literals, functional interfaces, and the implicit iteration in stream functions, such as the stream application programming interface (API) of Java 8. New specification syntax and proof techniques are provided in embodiments to support verification of programs using functional programming features.

An object in imperative style object-oriented programming languages is generally a location in memory having a value and referenced by an identifier. In Java, for example, objects generally store data such as variables. However, with the addition of functional programming features, functions can be treated as objects (referred to as function objects). For example, a function object can be provided as an argument to another function call. Nominally, reasoning about functions as first-class objects could require higher-order logic, and not the first-order logic in current automated DV tools that use SMT solvers. Embodiments identify functional programming use patterns, provide constructs for specifying code that uses these functional programming use patterns, and further provide support for verifying such specifications using DV tools (e.g., such as OpenJML), while remaining within the existing first-order logic paradigm and the capabilities of SMT solvers and other automated tools. Embodiments further discuss the extensions to markup languages that are designed for imperative style programming languages (e.g., JML) and their associated DV tools (e.g., OpenJML) needed to perform deductive verification for these commonly-used functional programming patterns.

Examples are described in terms of deductive verification for Java using OpenJML. Such examples build on JML and OpenJML to express specifications and perform verification of programs that include both imperative programming features and functional programming features. OpenJML translates Java code and formal requirements written in JML into a logical form and then mechanically checks that the implementation conforms to the specification. The checking of the verification conditions may be performed by a back-end SMT solver, such as Z3. Though examples and embodiments are discussed herein with reference to Java 8, JML and OpenJML, the techniques set forth herein are also applicable to extend other specification languages and/or DV tools that are designed for imperative style programming features. The techniques set forth herein may be used to extend any such specification languages and/or DV tools to enable those specification languages and/or DV tools to also work with functional style programming features in addition to the imperative style programming features for which they were designed.

Turning now to the figures, FIG. 1 illustrates an example DV tool 135 that aggregates specification information 125A from a program file 105 and specification information 125B from a specification file 110 to form combined specification information 125C (also referred to as aggregated specification information), according to embodiments of the present disclosure. The program file 105 may include a functional programming feature 115 (e.g., a functional programming object or function object) and an imperative programming feature 120 (e.g., an imperative programming object or imperative object). Functional programming is a programming paradigm—a style of building the structure and elements of computer programs—that treats computation as the evaluation of mathematical functions and avoids changing-state and mutable data. Functional programing may be a declarative programming paradigm, which means programming is done with expressions or declarations instead of statements. In functional code, the output value of a function depends only on the arguments that are passed to the function. Accordingly, calling a function $f$ twice with the same value for an argument x produces the same result $f(x)$ each time. This is in contrast to procedures depending on a local or global state, which may produce different results at different times when called with the same arguments but a different program state. Imperative programming, by contrast, is a programming paradigm that uses statements that change a program's state. An imperative programming feature generally consists of commands to be performed. Imperative programming focuses on describing how a program operates. Some programming languages such as Java 8 support both functional programming features and imperative programming features.

DV tool 135 may be designed to perform deductive verification on imperative programming features. However, the program 105 may include specification information 125A about the functional programming feature 115 that can be combined with specification information 125B in the specification file 110 by the DV tool 135 in a manner that enables the DV tool 135 to perform deductive verification on the functional programming feature 115. The DV tool 135 may also perform deductive verification on the imperative programming feature 120 using specification information 130 that is associated with the imperative programming feature 120 from the specification file 110.

The DV tool 135 may read the program file 105 and the specification file 110 to identify the functional programming feature 115 and associated specification information 125A and 125B. The DV tool 135 may then perform one or more operations to combine the specification information 125A with the specification information 125B to form combined specification information 125C. The combined specification information 125C may have a specification format for an imperative programming feature that would generate the same result as the functional programming feature 115. The DV tool 135 may generate one or more mathematical proof obligations 138 for the executable functional programming feature 115 using the combined specification information 125C having the specification format for the imperative programming feature. The combined specification information 125C and the functional programming feature 115 may be used together to generate mathematical proof obligations 138. The DV tool 135 may then provide the one or more mathematical proof obligations 138 to an SMT solver 140.

The SMT solver 140 may then determine whether the one or more mathematical proof obligations 138 are true. For example, if all the proof obligations can be demonstrated to be true, then the functional programming feature 115 can be claimed to be verified. The DV tool 135 may also generate one or more mathematical proof obligations for the imperative programming feature using the specification information 130 and provide the one or more mathematical proof obligations to the SMT solver 140 for verification. The SMT solver 140 may then perform verification on the mathematical proof obligations generated from the imperative programming feature 120. SMT solver 145 may generate verification results 145 as an output.

FIG. 2 illustrates an example specification 205 (in this case, an example JML specification) of an absolute value method, in accordance with one embodiment of the present disclosure. In one embodiment, example specification 205 corresponds to specification information 125A of FIG. 1. The absolute value method is a method that returns an absolute value of an integer (int) value. If the argument for the absolute value method is not negative, the argument is returned. If the argument is negative, the negation of the argument is returned. The example specification includes pre-conditions, post-conditions and frame-conditions for the absolute value method. Each of these conditions is a constraint that may be used to verify implementations of the absolute value method in program code.

FIG. 3 illustrates sample program code 302 comprising example characteristic uses of functional programming features, in accordance with embodiments of the present disclosure. In one embodiment, sample program code 302 corresponds to or includes a combination of functional programming feature 115 and imperative programming feature 120 of FIG. 1. Sample program code 302 includes a first functional programming feature (example A) 305, a second functional programming feature (example B) 310 and a third functional programming feature (example C) 315. These example functional programming features 305, 310, 315 are typical of software found in programs using functional programming features that is to be verified by DV tools.

The example uses of functional programming in the present disclosure include three code patterns, but are not limited to these three code patterns. The first code pattern, as set forth in the example A 305, includes function literals as actual arguments. The second code pattern, as set forth in example B, includes functional arguments that use a general library interface (e.g., a very general Java library interface). The third code pattern, as set forth in example C, includes stream objects and operations. Each of the use cases set forth in example A 305, example B 310 and example C 315 pose interrelated challenges for specification languages and DV tools configured to verify imperative style programming features such as JML and OpenJML.

One specification challenge is shown in example A 305. It shows a function literal as an actual argument (line 8) in a call of a method whose body (line 5) applies a function object to compute its effect, illustrating the first two use cases mentioned above. DV tools such as OpenJML work modularly. Each method is verified that it implements its specification, using the specifications of called methods to model their effects. The example method "modify" (called in line 8) takes a "Function" argument. The argument type gives little information about "modify's" argument (line 8), since "Function" and similar Java library function interfaces have very general specifications. They can in principle have any side-effects and compute any possible result consistent with the type signature. Thus, considering "modify" by itself, very little can be specified about its effect. In line 8, the argument of "modify" is a specific, concrete function object ($x \rightarrow x+1$). However, when reasoning about the call to "modify" using existing OpenJML-style modular reasoning, only the specification of its formal argument (which only says it is a "Function" object of a certain type) is used and not the specific implementation of the actual argument. This makes it difficult to prove anything specific about calls to "modify".

A second, related syntactic specification challenge shown in example A 305 is that there is no place (in pre-Java-8 JML) to put a specification for lambda functions, such as the one occurring in Line 8. A lambda function (also referred to as an anonymous function, a function literal, a lambda abstraction, or a lambda expression) may be a function definition that is not bound to an identifier. Lambda functions are often arguments that are passed to higher-order functions and/or a user for constructing the result of a higher-order function that needs to return a function. In general the body of the lambda function is an arbitrary block of code.

The third use pattern and specification challenge is the "Stream" API shown in example B 310. A stream may be a sequence of elements from a source that supports aggregate operations. Streams (e.g., such as Java 8's "Stream" API) use stream operations to express sophisticated data processing queries. A stream provides an interface to a sequenced set of values of a specific element type. However, streams do not actually store elements. Instead, streams compute elements on demand. Streams may consume from a data-providing source such as collections, arrays and/or input/output (I/O) resources. Streams support common operations from functional programming languages, such as filter, map, reduce, find, match, sorted, and so on. Two characteristics of stream operations include pipelining and internal iteration. With respect to pipelining, many stream operations return a stream themselves. This allows operations to be chained to form a larger pipeline. With respect to internal iteration, stream operations perform implicit (or internal) iteration rather than explicit (or external) iteration, in contrast to imperative programming features such as collections. Stream functions enable programmers to process data in a declarative manner. Streams can also leverage multi-core architectures without any need for writing multi-thread code.

As shown in example B 310, a function with side effects is applied to a stream of values, with the iteration being implicit. Traditional DV tools generally require loop invariants on explicit loops to reason about iteration, but with implicit iteration there is no explicit loop to specify.

Finally, example C 315 shows a general application of functional programming features. Here a function takes arbitrary function object inputs and produces a new function object as the return value, whose specification depends on the specifications of the input function objects.

The example functional programming features 305-315 are discussed below in greater detail with reference to FIGS. 7-11. Also set forth below with reference to FIGS. 5A-5D and 7-11 are four techniques that enable verification of functional programming patterns in a software library by specification languages and DV tools configured to verify imperative style programming features.

Figure 5A:
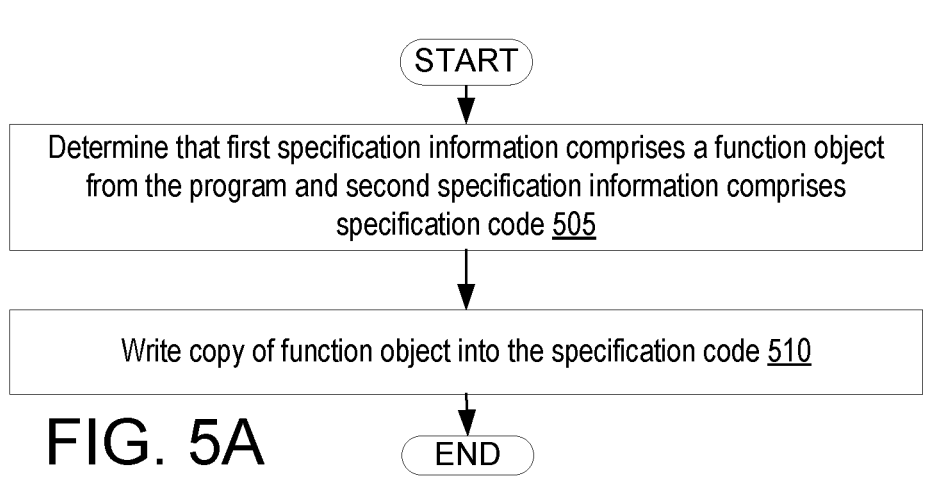
FIGS. 5A-D depict flowcharts illustrating various embodiments for methods of combining implementation information from a program and specification information from a specification to enable deductive verification of a functional programming feature in the program.
Figure 5B:
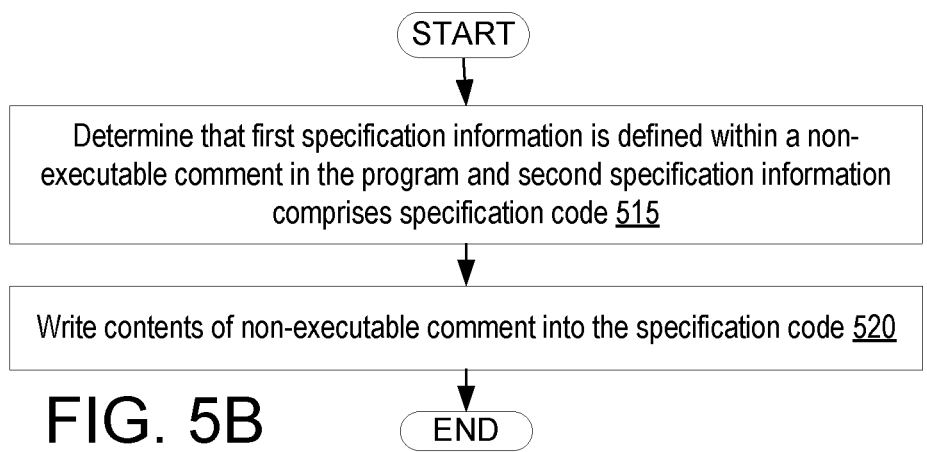
Figure 5C:
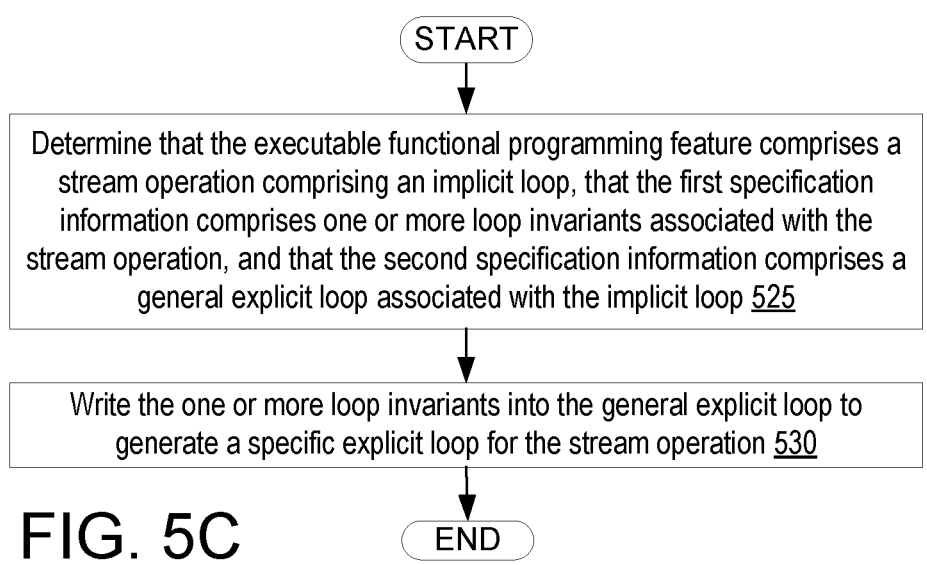
Figure 5D:
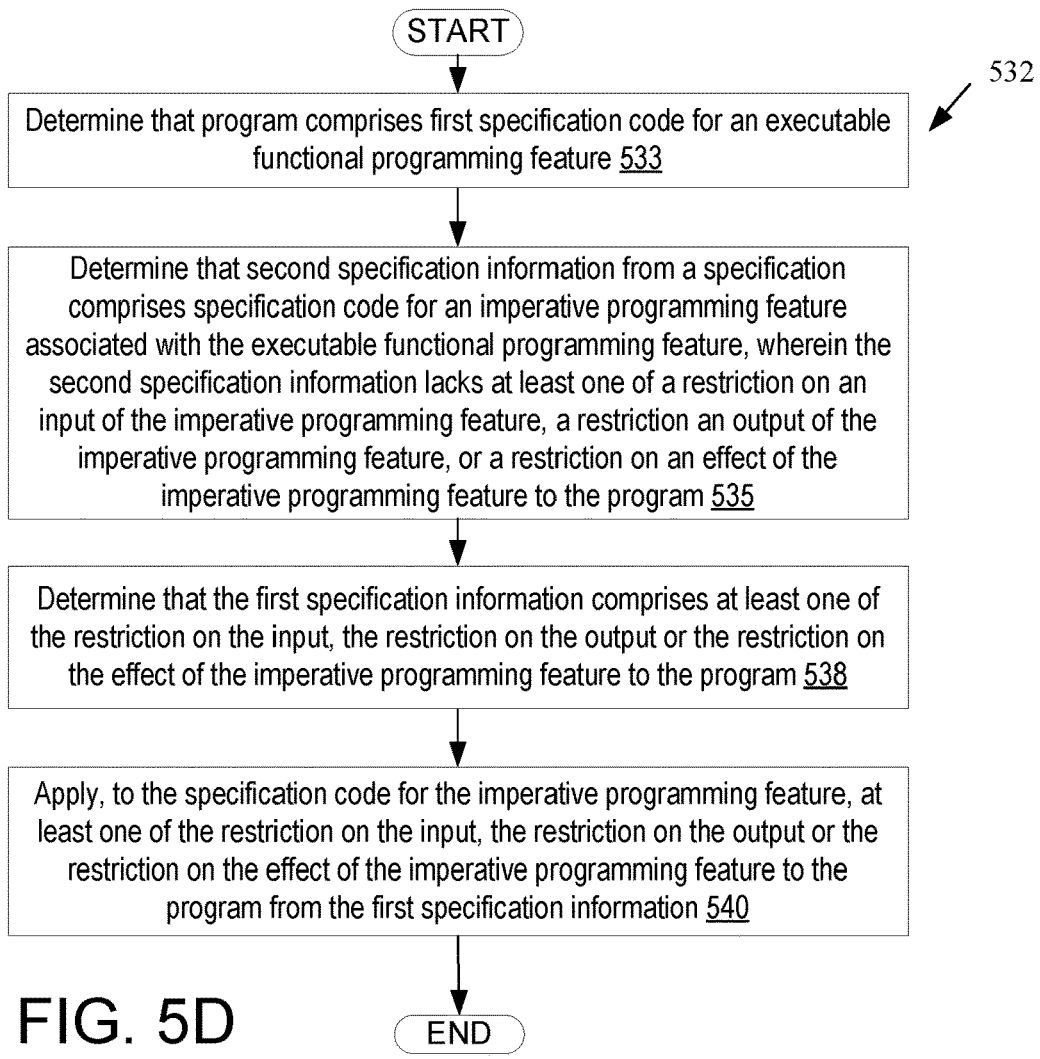
Figure 6:
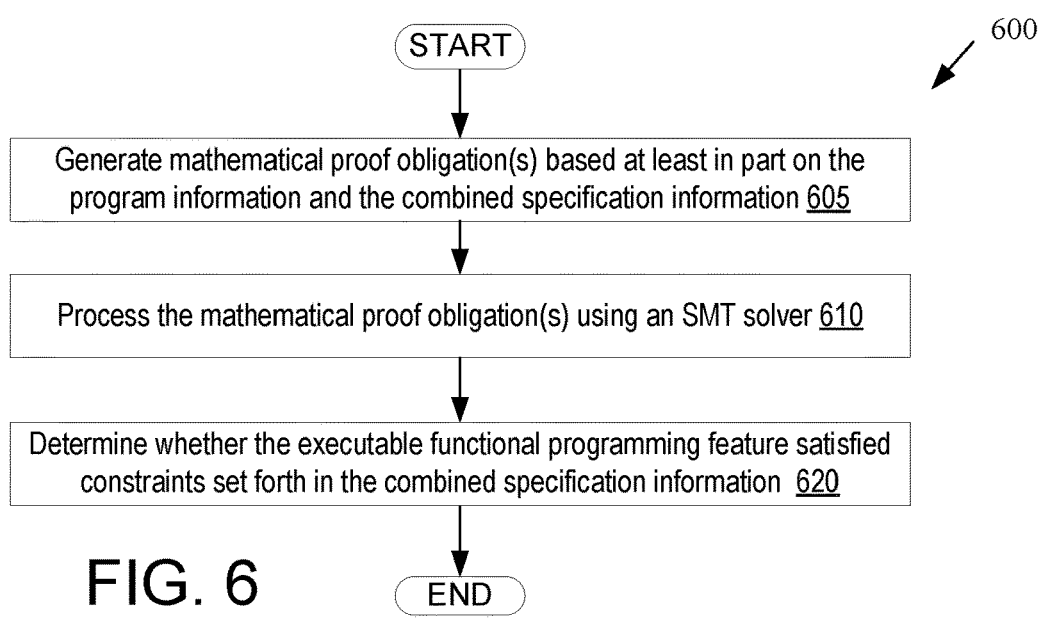
FIG. 6 depicts a flowchart illustrating one embodiment of a method for performing deductive verification using combined specification information from a program and a specification.

FIGS. 4-6 are flow diagrams showing various methods for performing deductive verification of functional programming features in a program, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a DV tool, such as DV tool 135, which may be executed on computing device 1200 of FIG. 12. The methods may be performed by processing logic of a DV tool designed to verify imperative programming features in some embodiments.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 depicts a flowchart illustrating one embodiment for a method 400 of verifying a functional programming feature using deductive verification. At block 405 of method 400, processing logic obtains first specification information for an executable programming feature from a program (e.g., from a program file). The executable programming feature may be, for example, a function object. The processing logic may be processing logic for a DV tool (e.g., OpenJML), which may receive the first specification information by reading the program file. The program file may include, for example, executable program source code as well as non-executable comments. Some of the non-executable comments may include the first specification information, which may be specification text associated with one or more functional programming features of the program. The first specification information associated with the one or more functional programming features may also be represented in the program file as something other than non-executable comments, such as executable code.

In embodiments, the first specification information is identified by reading and/or parsing source code for the program (e.g., a program file containing source code for the program) and identifying a particular set of characters that indicate specification information. Specification information may be identified as information that is within the construct "/* @ . . . @*/" in the source code in some embodiments, where the specification information would be inserted in the place of the ellipses. Other syntaxes may alternatively be used to call out specification information in the program code. In some embodiments, the first specification information is a function object. In some embodiments, the first specification information provides one or more pre-conditions, post-conditions and/or invariants associated with the functional programming feature. Invariants are properties that must be maintained, and may be implicitly included in pre-conditions and/or post-conditions.

At block 410, the processing logic obtains second specification information for the executable functional programming feature from a specification associated with the program. For example, processing logic may add a specification file containing the second specification information, and may parse the specification text in the specification file to identify the second specification information. The specification may be a specification file that was written for the program and/or for at least one operation, module or function used by the program. The specification may be, for example, a specification for a library function used by the program. In some embodiments, the second specification information comprises specification text that is written for an imperative style function that is functionally equivalent to (or that at least produces a similar result as) the executable functional programming feature.

At block 415, processing logic aggregates the first specification information with the second specification information to form combined specification information for the executable functional programming feature. The combined specification information may include specification text that has a format of an imperative style programming feature, even though the combined specification information is associated with an executable functional programming feature and will be used to perform deductive verification on the executable functional programming feature. Various techniques for combining the first specification information with the second specification information are described below with reference to FIGS. 5A-D.

At block 420, processing logic determines whether the executable functional programming feature satisfies one or more verification conditions using the combined specification information. One example method for determining whether the executable functional programming feature satisfies the one or more verification conditions using the combined specification information is described below with reference to FIG. 6.

At block 422, processing logic determines whether the one or more verification conditions associated with the executable functional programming feature are satisfied. If the verification conditions are satisfied, the method continues to block 425, and the functional programming feature is successfully verified. If one or more of the verification conditions are not satisfied, the method proceeds to block 428, and processing logic fails to verify the functional programming feature.

At block 430, processing logic may further obtain third specification information for an imperative programming feature of the program from the specification. At block 435, processing logic determines whether the one or more verification conditions associated with the imperative programming feature are satisfied. If the verification conditions are satisfied, the method continues to block 445, and the imperative programming feature is successfully verified. If one or more of the verification conditions are not satisfied, the method proceeds to block 450, and processing logic fails to verify the imperative programming feature.

Embodiments enable an imperative style DV tool to perform verification on both functional programming features and imperative programming features.

FIGS. 5A-D depict flowcharts illustrating various embodiment for methods of aggregating first specification information from a program and second specification information from a specification to enable deductive verification of a functional programming feature in the program. The methods of FIGS. 5A-D may be performed, for example, at block 415 of method 400. Alternatively, or additionally, some operations of the methods of FIGS. 5A-D may be performed at or before block 405, and other operations of the methods of FIGS. 5A-D may be performed at block 415.

FIG. 5A illustrates an example method 500 in which inlining is performed to copy first specification information (e.g., functional interface parameters from program code) into specification text in a specification (which may be viewed as second specification information). Inlining (also referred to as inline expansion), is a technique that replaces a function call site with the body of the called function. In the context of inlining for a specification, inlining may include writing executable code into specification text rather than relying on separate specification text that describes the executable code. Method 500 sets forth one solution to the specification challenge identified in example A 305 above. In example A 305, the actual argument to the function modify is another function, namely a lambda expression literal (Line 8), which reads, "x→x+1". In embodiments, the specification information associated with a functional programming feature may be a functional object (also referred to as a function object) in the program code of the program. In example A 305, the lambda expression literal may be used as first specification information.

At block 505 of method 500, processing logic determines that first specification information from a program comprises a function object from the program (e.g., the lambda expression literal set forth in example A 305). Processing logic may additionally determine that the second specification information from the specification comprises specification text (e.g., specification text for the object "modify"). Processing logic may parse program text of the program to identify the function object (e.g., the lambda expression literal).

At block 510, processing logic may write the function object (e.g., the lambda expression literal) into the specification text (e.g., the second specification information for the object modify) and/or into the program text of the program. If the body of the function object (e.g., the lambda expression literal) is available as source code, then the call of the object (e.g., modify) can be replaced by an inlined version of its body, with the actual arguments substituted and expanded in the specification text and/or the program text. The call of the object (e.g., modify) then becomes simply "value=value+1", which is easily handled by existing DV techniques. Thus, one technique for handling the loss of information caused by very general functional interface types is to inline the called method (e.g., the lambda expression literal of example A 305), avoiding a conversion to the general type.

Inlining such as set forth in method 500 may work for functional interface types having specific properties. Conceptually, a functional interface has exactly one abstract method; that method is the one applied when a function object conforming to the functional interface is applied to some arguments. Since default methods have an implementation, they are not abstract. Inlining works when the called method is reasonably small and any actual arguments of functional interface types are function literals (e.g., such as a lambda expression literal).

The above technique breaks modularity, a desirable property of verification, because it relies on knowing the body of called methods. Additionally, if the called executable functional programming feature (e.g., method) is in a library, the body of that executable functional programming feature may not even be available. Accordingly, a second solution is contemplated, which involves the use of model programs (e.g., such as JML model programs).

FIG. 7 illustrates an example model program 705 for a functional programming feature, in accordance with one embodiment of the present disclosure. The example model program 705 may correspond to functional programming feature 115, specification information 125A and/or specification information 125B of FIG. 1 in embodiments. A model program is an alternate specification syntax in which the behavior of a method is specified using statements (e.g., such as Java-like statements) that summarize and possibly abstract the effect of the method.

The example model program 705 specifies the "modify" method of example A 305. The model program 705, the text within the braces, duplicates the body of the method set forth in example A 305. In the more common case, it is a simplification or abstraction of the body of the functional programming feature. For instance, if we did not care about the final value, just that there were no other side-effects, the model program could be simplified. FIG. 8 illustrates an additional example model program 805 for a functional programming feature, in accordance with one embodiment of the present disclosure. The example model program 805 may correspond to functional programming feature 115, specification information 125A and/or specification information 125B of FIG. 1 in embodiments. Model program 805 is a simplified version of model program 705. Here we know that "value" might change, but that nothing else will change. This could also be stated using a clause assignable value; without a model program.

When a method with a model program specification is called, the model program may be inlined in place of the call, along with checking any other specification clauses. This preserves modularity because only the specification is used. Model programs work best when there is a succinct summary of the method being specified, as in this example.

FIG. 5B illustrates an example method 512 in which specification information associated with a functional programming feature is included in the program code of the program using comments. At block 515 of method 512, processing logic determines that first specification information from a program is defined within a non-executable comment or other type of comment in the program. Processing logic may additionally determine that the second specification information from the specification comprises specification text associated with the functional programming feature. Processing logic may parse the program to identify the first verification information. In one embodiment, the first verification information is identified by searching for information that is between a first statement of "/*@{" and a second statement of "}@*/". For example, in the code "public void modify (/*@{PositivePureFunction} @ */Function<Integer, Integer> map);" processing logic may identify "PositivePureFunction" as the first specification information.

At block 520, processing logic may write the contents of the non-executable comment (the first specification information) into the specification text (e.g., the second specification information). Thus, processing logic may inline the non-executable comment as specification information. In some instances, the non-executable comment identifies additional specification text associated with the contents of the non-executable comment (e.g., the second specification text may be a reference to a model interface).

FIG. 9 illustrates example specification information 905 for a functional programming feature with model interfaces, in accordance with one embodiment of the present disclosure. The example specification information 905 may correspond to specification information 125A and/or specification information 125B of FIG. 1 in embodiments. One solution developed is to specify a functional parameter (such as the functional parameter of "modify" set forth in example A 305) with a more restrictive specification than that in the Java code or other programming language code (e.g., a more restrictive specification than the very general function "Function<T,R>"). For example, suppose it is required that all uses of the function have a positive argument and produce a positive result, with no side effects. The specification for such a method can be encapsulated in an interface as set forth in the example specification information 905.

In order to insert the new type as the type of a parameter (without changing the source code such as Java source code), embodiments herein extend the specification language syntax (e.g., JML syntax) as set forth in FIG. 10. FIG. 10 illustrates an example program code 1005 for a functional programming feature, in accordance with one embodiment of the present disclosure. The example program code 1005 may correspond to functional programming feature 115 and/or specification information 125A of FIG. 1 in embodiments. Here the type name within the specification language construct (e.g., JML construct) "/* @ { . . . } @*/" (which is a Java comment) is the type to be used within specifications. This is a way of attaching a specification to a function object. Such syntax can be used in any declaration. It creates a type checking obligation that the specification type is indeed a subtype of the stated programming language type (e.g., Java type). Also using such a specification type has two effects on proof obligations. First, the actual argument should be shown to meet the specification stated by the specification type of the formal argument. In example A 305, the lambda expression "x→x+1" must be shown to be a positive pure function. A pure function is a function that has the following two properties. The first property is that the function always evaluates the same result value given the same argument value(s). The function result value cannot depend on any hidden information or state that may change while program execution proceeds or between different executions of the program, nor can it depend on any external input from I/O devices. The second property is that evaluation of the result does not cause any semantically observable side effect or output, such as mutation of mutable objects or output to I/O devices. The second effect of such a specification type on proof obligations is that when proving properties of the body of a method, the formal argument may be assumed to have the specification type, not just the more general type (e.g., the more general Java type).

The functional programming feature "map" in example program code 1005 is an example of a function object. A standard program code for "map" without the syntax provided in embodiments would be written as "public void modify" without the language between the slashes, followed by the argument "map" (which may have a particular type, which may be a function of an integer producing an integer). However, the function "map" is very general, and a DV tool would not be able to reason about any specific actions that "map" has just knowing that it is a function. The provided syntax of "/* @ { . . . } @ */" provides inline specification information in the program code that indicates specifics about the function "map". In the example, "/* @ {PositivePureFunction} @*/" references the specification information 905 which includes a model interface associated with "PositivePureFunction" as specification text for "map." The provided syntax is a way to indicate that "map" is a positive pure function. The specification information 905 states that "PositivePureFunction" is an interface, that it has a method called "apply", and that "apply" has a requirement that its input is larger than 0 and ensures that its output is larger than 0.

FIG. 5C illustrates an example method 522 in which the functional programming feature comprises a stream operation that has an implicit loop (e.g., that can be represented using an implicit loop). Accordingly, the functional programming feature performs implicit iteration rather than explicit iteration. For example, user code may use the functional programming feature with its implicit loop. However, the functional programming feature may be from a library with general application, and may thus lack loop invariant information.

At block 525 of method 522, processing logic determines that the executable functional programming feature comprises the stream operation comprising the implicit loop and/or that the first specification information comprises one or more loop invariants associated with the stream operation. Processing logic may additionally determine that the second specification information comprises a general explicit loop associated with the implicit loop. The general explicit loop may represent the implicit loop, but may lack specific properties such as loop invariants associated with the implicit loop. For example, there may be a specification for the implicit loop in a library, and that specification may use an explicit loop to specify the implicit loop. However, that explicit loop does not have the loop invariant information that is only available in the user code. Embodiments provide a new specification syntax for specifying functional programming features such as stream operations that can be interpreted by a DV tool for evaluating imperative style programming features that include implicit loops, such as stream objects.

At block 530, processing logic may write the one or more loop invariants from the program into the general explicit loop to generate a specific explicit loop for the stream operation. The specific explicit loop may include the constraints (e.g., loop invariants) for the stream operation that enable the stream operation to be verified. Hence, processing logic may combine loop invariant information from the user code with the explicit iteration of the specification that represents the implicit iteration of the functional programming feature in the library.

FIG. 11 illustrates example combined specification information 1115 for a functional programming feature, in accordance with one embodiment of the present disclosure. The functional programming feature 1115 in the illustrated example is for a particular type of function object called a stream object. The combined specification information 1115 may correspond to combined specification information 125C of FIG. 1 in embodiments.

In imperative languages, explicit loops are typically used to perform iteration. For example, an explicit loop may specify a set of instructions to be performed for each element i from i=0 to n, where n may be a specified value, the length of an array, and so on. DV tools often rely on a specification to provide one or more loop invariants to perform verification. Loop invariants specify properties that are always the same for each iteration of the loop.

It is preferable to specify loop invariants and other properties about a loop in a specification. However, in functional programming features such as stream objects there are no explicit loops for which loop invariants and/or other properties may be specified. For example, a functional programming feature may include a stream of outputs coming one after another (e.g., such as a stream of characters being read from a file, a stream of numbers being generated, etc.). Additionally, a functional programming feature may include one or more operations that operate on the stream of outputs. An example operation might be to transform each element of the stream into a new value with a provided function. Accordingly, a function object may be specified that takes input values from a stream and produces an output stream of output values that are different from the input values. The output values could be the same type or a different type from the input values, and/or could be anything at all that the programming language supports.

Stream operations have implicit iteration, but lack explicit iteration such as an explicit loop. Accordingly, stream operations implicitly iterate over the elements of a stream. The lack of explicit iteration is problematic for the generation of a specification for a program or function because the lack of an explicit iteration or loop means that there is no place to assign loop invariants associated with the stream operation.

Many functional programming features such as stream objects are library operations. For example, there may be a general library that has numerous functional programming features, operations and/or functions (e.g., such as stream objects). Such library functions, operations, etc. are usually very general so that they can be used for many purposes. Accordingly, only general properties may be stated about the library functions, operations, functional programming features, etc. in a specification. However, such a library function that is used in a program will have specific properties such as specific pre-conditions and/or input properties, specific post-conditions and/or output properties, and so on. For example, as used in a program, all of the inputs for the library function may be numbers and all of the outputs of the library function may be prime numbers. In another example, all the inputs for the library function may be employees, and all of the outputs may be the social security numbers of those employees. Accordingly, in the program there may be specific information associated with a functional programming feature and in the general specification for the functional programming feature there may generic information regarding what the functional programming feature does.

One solution that is implemented in embodiments is to divide the specification information and include a first portion of the specification information in the specification (e.g., specification file) and to include a second portion of the specification information in the program (e.g., in the program file). The first portion of the specification information may be an explicit loop that defines the stream operation using imperative style programming. The first portion of the specification information provides a logical interpretation of the implicit iterations of the stream operation or other functional programming feature. The explicit loop in the specification of the library function may specify general properties about the functional programming feature because it is a library function having many different uses. Accordingly, the first portion of the specification information may be general in nature, and may lack specifics such as loop invariants and/or other properties.

The second portion of the specification information provides the loop invariants and/or other loop properties within the program (e.g., as comments). The second portion of the specification information may then be inlined with the first portion of the specification information. At the time that the DV tool performs logical interpretation, it may combine the first portion of the specification information and the second potion of the specification information.

Nearly all of the operations on Java 8's stream objects operate on each element of the stream. Similar assumptions can also be made for stream objects of other programming languages. For actions without side-effects, these can be specified with a quantified expression connecting input and output values. Specifications of operations with side-effects require loop invariants. In one embodiment, a solution includes two pieces. in the first piece, a stream operation can be specified using the model program syntax described above (e.g., for model program 705 or model program 805), where the model program contains an equivalent explicit loop, with general loop specifications. In the second piece, which is set forth in greater detail below, processing logic is able to supply some loop invariants that are attached to the model program's loop when the model program is inlined.

Specification information from an example specification file 1105 is illustrated for the method "forEachOrdered". The method "forEachOrdered" in this example may be a library function. It implicitly has a stream of arbitrary type as an input and a stream as output. The method "forEachOrdered" has an operation called consumer that performs an unspecified operation. The unspecified operation could be anything at all. Lines 1-5 of the specification file 1105 include a loop invariant that indicates that some undefined property or condition is true every time around the loop. Lines 1-5 further provide a specification called "decreases" that indicates that the loop will terminate at some point. That is the very general specification of the "ForEachOrdered" method that may be in a library.

As shown, the specification information for "forEachOrdered" includes an explicit loop (which is an imperative programming feature) that indicates to perform the "consumer" action for each i. However, the specification information for "forEachOrdered" in the specification file 1105 does not conclude anything about the effect of this operation because the effect of the "consumer" operation is unknown in the specification file 1105. Accordingly, the specification file 1105 includes an explicit general loop specification associated with "forEachOrdered".

In this example "forEachOrdered" is a library method and its specification is general and independent of the context in which it is used and of a consumer's action. The function consumer may itself be inlined if possible, but stronger loop invariants are desirable. So in the calling context, some loop invariants may be supplied that are attached to the library function's model program loop when the model program is inlined. In one example, the prototype syntax is set forth in example program file 1110. The ellipses denote expressions appropriate to a put operation.

The example program file 1110 includes a specified operation that states "v→put(v)". The specified operation indicates to take v, which may be whichever stream element is being operated on, and place that v at a location (e.g., store the v in an array). The example program file 1110 may further include a loop invariant, loop modifier, etc. that describe the effects, inputs, outputs, etc. of the operation that is specified for "s.forEachOrdered." The keyword "inlined_loop" in the program file 1110 may be interpreted by a DV tool to mean that provided loop invariants are to be attached to the loop that is present in the library specification for the library routine "ForEachOrdered".

After aggregating the specification information from the specification file 1105 and the specification information from the program file 1110 (e.g., by inlining the model program), a combined specification information 1115 is generated. When the code in the program file 1110 (e.g., the code "///@ loop_invariant . . . ; loop_modifies . . . ; inlined_loop;") is translated for logical purposes by the DV tool, then the combined specification information 1115 may be produced. In the combined specification information 1115, the "forEachOrdered" call becomes as shown, with a put operation happening on each value of the stream as it is processed. The combined specification information 1115 includes a combination of the loop invariants/loop properties both from the specification and from the user code that are all put together from two distinct locations. The combined specification information 1115 is specification text that can be processed by traditional imperative DV tools such as OpenJML. The combined specification information 1115 may be synthesized code that the DV tool generates by combining specification information from the specification file 1105 and the program file 1110.

FIG. 5D illustrates an example method 532 in which the first specification information from the program comprises one or more restrictions that are absent from the second specification information. At block 533 of method 532, processing logic determines that the program comprises the first specification information. At block 535, processing logic determines that the second specification information from a specification comprises specification text for an imperative programming feature that lacks at least one of a restriction on the imperative programming feature's input (e.g., a pre-condition), a restriction the imperative programming feature's output (e.g., a post-condition) or a restriction on an effect of the imperative programming feature to the program. The second specification information may also include specification text for a programming feature that lacks one or more invariants.

At block 538, processing logic further determines that the first specification information comprises at least one of the restrictions on the imperative programming feature's input (and/or on an associated functional programming feature's input), the restriction on the imperative programming feature's output (and/or on an associated functional programming features output) or the restriction on the effect of the imperative programming feature (and/or an associated functional programming feature) to the program. Processing logic may also determine that the first specification information includes one or more invariants.

At block 540, processing logic may apply at least one of the restrictions on the input, the restriction on the output, the restriction on the effect of the programming feature to the program, or the one or more invariants from the first specification information into the specification text of the second specification information. Combined specification information 1115 of FIG. 11 provides one example of one or more restrictions being written into a specification based on specification information from a program.

FIG. 6 depicts a flowchart illustrating one embodiment for a method 600 of performing deductive verification using combined specification information from a program and a specification. At block 605 of method 600, processing logic generates one or more mathematical proof obligations associated with a functional programming feature of a program based at least in part on combined specification information associated with the functional programming feature. The combined specification information may have a format of an imperative programming feature expressed in specification text. At block 610, processing logic processes the mathematical proof obligation(s) using an SMT solver. At block 620, processing logic determines whether the executable functional programming feature satisfied constraints set forth in the combined specification information based on a result of the processing by the SMT solver.

The techniques set forth herein were used to analyze a body of software that included a Java security protocol library. The library enables establishing secure network communication sessions and composing and decomposing the packet frames that constitute network messages. OpenJML was extended to be able to parse and interpret Java 8 syntax. Then, as described earlier, OpenJML was augmented to handle the logical interpretation of Java 8 features, to be able to inline the source code bodies of Java methods, to implement the syntax and semantics of JML model programs, to implement the syntax and semantics of specification types, and to implement the additions for handling implicit iteration. The source code under study consisted of about 5K lines of Java code across about 700 methods in 96 classes in 11 Java packages.

Figure 12:
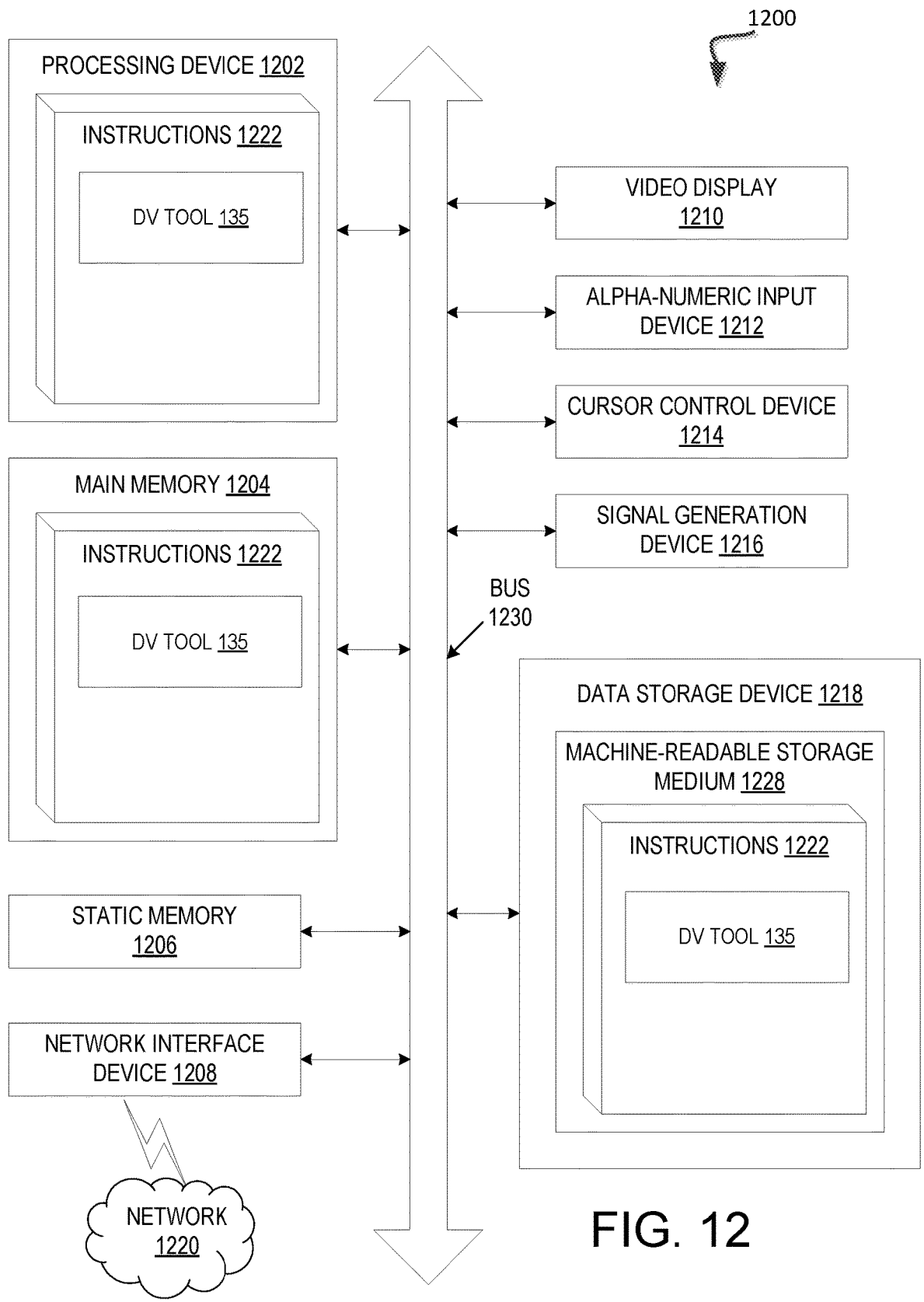
FIG. 12 is a schematic block diagram that provides one example illustration of a computing device executing a deductive verification tool, according to one embodiment of the present disclosure.

FIG. 12 illustrates a diagrammatic representation of a machine in the exemplary form of a computer system (computing device) 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (e.g., a processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions for DV tool 135 for performing the operations discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable storage medium 1228 on which is stored one or more sets of instructions of the DV tool 135 embodying any one or more of the methodologies or functions described herein. The instructions may also reside, completely or at least partially, within the main memory 1204 and/or within processing logic of the processing device 1202 during execution thereof by the computer system 1200, the main memory 1204 and the processing device 1202 also constituting computer-readable media.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "receiving", "processing", "combining", "verifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are described with reference to Java 8, JML and Open JML. However, it should be understood that the principles and techniques set forth herein may be applied to other programming languages that have both imperative programming features and functional programming features. Additionally, embodiments also apply to specification languages other than JML and DV tools other than OpenJML. Accordingly, it will be appreciated that a variety of programming languages, specification languages and/or DV tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
   obtaining, by a deductive verification tool configured to verify programs having imperative programming features, first specification information for a first functional programming feature from a program that comprises the first functional programming feature as well as a first imperative programming feature, wherein the first functional programming feature comprises one or more function expressions that avoid changing a program state of the program, and wherein the first imperative programming feature comprises a first sequence of one or more statements that change the program state of the program;
   obtaining, by the deductive verification tool, second specification information for the first functional programming feature from a specification associated with the program;
   identifying, by the deductive verification tool, a second imperative programming feature that performs a second sequence of statements to change the program state of the program to achieve a same result as performing the one or more function expressions by the first functional programming feature that avoid changing the program state of the program;
   aggregating, by the deductive verification tool, the first specification information with the second specification information to form a combined specification information for the first functional programming feature, the combined specification information having a specification format of the second imperative programming feature;

generating, by the deductive verification tool, one or more mathematical proof obligations for the second imperative programming feature using the combined specification information;

determining that the first functional programming feature satisfies the one or more mathematical proof obligations; and verifying the first functional programming feature.

2. The computer-implemented method of claim 1, wherein the second specification information comprises incomplete specification text for the second imperative programming feature that lacks at least one of a restriction on an input of the second imperative programming feature, a restriction on an output of the second imperative programming feature or a restriction on an effect of the second imperative programming feature to the program, and wherein the first specification information comprises at least one of the restriction on the input, the restriction on the output or the restriction on the effect of the second imperative programming feature to the program, the method further comprising:

applying, to the incomplete specification text for the second imperative programming feature, at least one of the restriction on the input, the restriction on the output or the restriction on the effect of the second imperative programming feature to the program.

3. The computer-implemented method of claim 1, wherein the first functional programming feature comprises a stream operation comprising an implicit loop, wherein the first specification information comprises one or more loop invariants associated with the stream operation, and wherein the second specification information comprises a general explicit loop associated with the implicit loop, the method further comprising:

writing the one or more loop invariants into the general explicit loop to generate a specific explicit loop for the stream operation.

4. The computer-implemented method of claim 1, wherein the first specification information comprises a function object for the first functional programming feature, and wherein the second specification information comprises specification text, the method further comprising:

writing a copy of the function object into the specification text.

5. A method comprising:

obtaining, by a processing device, first specification information for an executable functional programming feature from a program, wherein the functional programming feature comprises one or more function expressions that avoid changing a program state of the program;

obtaining, by the processing device, second specification information for the executable functional programming feature from a specification associated with the program;

identifying, by the processing device, an imperative programming feature that performs a sequence of statements to change the program state of the program to achieve a same result as performing the one or more function expressions by the executable functional programming feature that avoid changing the program state of the program;

aggregating, by the processing device, the first specification information with the second specification information to form a combined specification information for the executable functional programming feature, wherein the combined specification information has a specification format for the imperative programming feature; and verifying the executable functional programming feature using the combined specification information.

6. The method of claim 5, the method further comprising:

generating one or more mathematical proof obligations associated with the executable functional programming feature using the combined specification information having the specification format for the imperative programming feature.

7. The method of claim 6, wherein the second specification information comprises specification text for the imperative programming feature that lacks at least one of a restriction on an input of the imperative programming feature, a restriction an output of the imperative programming feature or a restriction on an effect of the imperative programming feature to the program, and wherein the first specification information comprises at least one of the restriction on the input, the restriction on the output or the restriction on the effect of the imperative programming feature to the program, the method further comprising:

applying, to the specification text for the imperative programming feature, at least one of the restriction on the input, the restriction on the output or the restriction on the effect of the imperative programming feature to the program.

8. The method of claim 5, wherein the executable functional programming feature comprises a function call of a function object, the method further comprising:

determining that the first specification information is defined within a non-executable comment in the program, wherein the first specification information comprises a type checking obligation associated with the function object, and wherein the second specification information comprises specification text for the function object.

9. The method of claim 5, further comprising:

generating one or more mathematical proof obligations based at least in part on the combined specification information;

processing the one or more mathematical proof obligations using a satisfiability modulo theories (SMT) solver; and determining, as a result of the processing, that the executable functional programming feature satisfies the one or more mathematical proof obligations.

10. The method of claim 5, wherein the first specification information comprises a function object from the program, and wherein the second specification information comprises specification text, the method further comprising:

writing a copy of the function object into at least one of the specification text or program text.

11. The method of claim 5, wherein the executable functional programming feature comprises a stream operation comprising an implicit loop, wherein the first specification information comprises one or more loop invariants associated with the stream operation, and wherein the second specification information comprises a general explicit loop associated with the implicit loop, the method further comprising:

writing the one or more loop invariants into the general explicit loop to generate a specific explicit loop for the stream operation.

12. The method of claim 5, further comprising:
receiving third specification information for an imperative programming feature of the program from the specification; and
verifying the imperative programming feature of the program using the third specification information.

13. A computing device comprising:
a memory; and
a processing device operatively coupled to the memory, the processing device to:
obtain first specification information for a functional programming feature from a program, wherein the functional programming feature comprises one or more function expressions that avoid changing a program state of the program;
obtain second specification information for the functional programming feature from a specification associated with the program;
identify an imperative programming feature that performs a sequence of statements to change the program state of the program to achieve a same result as performing the one or more function expressions by the functional programming feature that avoid changing the program state of the program;
aggregate the first specification information with the second specification information to form a combined specification information for the functional programming feature, wherein the combined specification information has a specification format for the imperative programming feature; and
verify the functional programming feature using the combined specification information.

14. The computing device of claim 13, wherein the processing device is further to:
generate one or more mathematical proof obligations for the functional programming feature using the combined specification information having the specification format for the imperative programming feature.

15. The computing device of claim 13, wherein the functional programming feature comprises a function call of a function object, and wherein the processing device is further to:
determine that the first specification information is defined within a non-executable comment in the program, wherein the first specification information comprises a type checking obligation associated with the function object, and wherein the second specification information comprises specification text for the function object.

16. The computing device of claim 13, wherein the processing device is further to:
generate one or more mathematical proof obligations based at least in part on the combined specification information;
process the one or more mathematical proof obligations using a satisfiability modulo theories (SMT) solver; and
determine, as a result of the processing, that the functional programming feature satisfies the one or more mathematical proof obligations.

17. The computing device of claim 13, wherein the second specification information comprises specification text for the imperative programming feature that lacks at least one of a restriction on an input of the imperative programming feature, a restriction an output of the imperative programming feature or a restriction on an effect of the of the imperative programming feature to the program, wherein the first specification information comprises at least one of the restriction on the input, the restriction on the output or the restriction on the effect of the imperative programming feature to the program, and wherein the processing device is further to:
apply, to the specification text for the imperative programming feature, at least one of the restriction on the input, the restriction on the output or the restriction on the effect of the imperative programming feature to the program.

18. The computing device of claim 13, wherein the first specification information comprises a function object from the program, and wherein the second specification information comprises specification text, and wherein the processing device is further to:
write a copy of the function object into at least one of the specification text or program text.

19. The computing device of claim 13, wherein the functional programming feature comprises a stream operation comprising an implicit loop, wherein the first specification information comprises one or more loop invariants associated with the stream operation, and wherein the second specification information comprises a general explicit loop associated with the implicit loop, and wherein the processing device is further to:
write the one or more loop invariants into the general explicit loop to generate a specific explicit loop for the stream operation.

20. The computing device of claim 13, wherein the processing device is further to:
receive third specification information for an imperative programming feature of the program from the specification; and
verify the imperative programming feature of the program using the third specification information.

* * * * *

UNITED STATES PATENT AND TRADEMARK OFFICE
CERTIFICATE OF CORRECTION

Page 1 of 1

PATENT NO. : 10,733,074 B1
APPLICATION NO. : 15/957746
DATED : August 4, 2020
INVENTOR(S) : David R. Cok and Serdar Tasiran It is certified that error appears in the above-identified patent and that said Letters Patent is hereby corrected as shown below:

In the Claims

In Claim 5, Column 19, Line 51, insert --executable-- after, wherein the

Signed and Sealed this
First Day of September, 2020

Andrei Iancu
*Director of the United States Patent and Trademark Office*